J. GAY.
TROLLEY.
APPLICATION FILED OCT. 29, 1912.
1,075,349.
Patented Oct. 14, 1913.
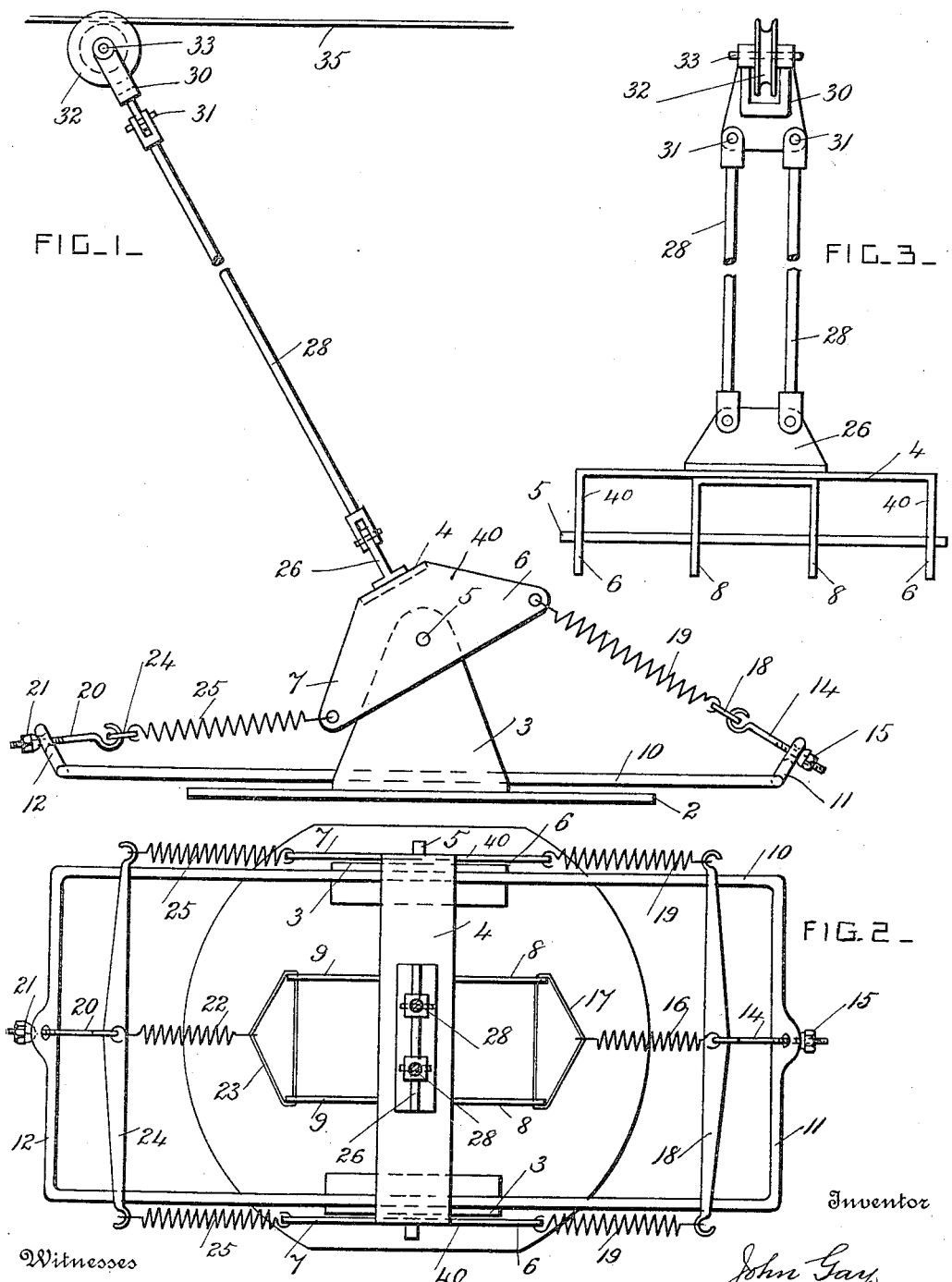

UNITED STATES PATENT OFFICE.

JOHN GAY, OF JORDANVILLE, NEW YORK.

TROLLEY.

1,075,349.  Specification of Letters Patent.  Patented Oct. 14, 1913.

Application filed October 29, 1912. Serial No. 728,432.

*To all whom it may concern:*

Be it known that I, JOHN GAY, a citizen of the United States, residing at Jordanville, in the county of Herkimer and State of New York, have invented certain new and useful Improvements in Trolleys; and I do hereby declare the following to be a full, clear, and exact description of the invention, such as will enable others skilled in the art to which it appertains to make and use the same.

This invention relates to overhead trolleys for electric railroads; and it consists in the novel construction and combination of the parts hereinafter fully described and claimed.

In the drawings, Figure 1 is a side view of a trolley constructed according to this invention. Fig. 2 is a plan view of the supporting devices, showing the trolley pole in section and in a vertical position. Fig. 3 is a front view of the trolley pole and tilting bracket.

The trolley is provided with a supporting base-plate 2 which is secured to the roof of the car, and upwardly projecting bearings 3 are secured to this base-plate. A tilting bracket 4 is provided. This bracket is formed of a crosspiece having substantially triangular plates 40 at its ends which straddle the two bearings 3 and which are pivoted to them by a pin 5. The lower angle portions of the plates form longitudinally projecting arms 6 and 7 upon opposite sides of the pin 5. The bracket has also two pairs of longitudinally projecting arms 8 and 9 arranged at its middle part at substantially equal distances apart from each other and from the end arms. A rectangular frame 10, formed of metallic rods or tubes, is secured to the base-plate in any approved way, and projects longitudinally of the car, and this frame has a crossbar 11 at one end and a crossbar 12 at the other end. A tension rod or hook 14 provided with an adjusting nut 15 engages with the crossbar 11, and 16 is a helical spring connected to the tension rod at one end. The other end of the spring 16 is connected to the two arms 8 by a flexible connection 17 which equalizes the pull of the spring upon the two arms. An equalizing bar 18 is pivoted centrally to the tension rod or hook 14, and the ends of this bar 18 are connected to the two end arms 6 by similar helical springs 19. The other crossbar 12 is provided with an adjustable tension rod or hook 20 having an adjusting nut 21. A helical spring 22 is pivoted to the hook 20 and is connected to the two intermediate arms 9 by a flexible equalizing connection 23. An equalizing bar 24 is pivoted centrally to the hook 20, and 25 are helical springs arranged between the ends of the equalizing bar 24 and the arms 7. A plate 26 is secured to the middle part of the bracket 4 in line with its pivot, and the trolley pole is formed of two parallel rods 28 which are pivoted to the plate 26 so that they are free to oscillate crosswise of the car. The trolley harp 30 is pivoted to the upper ends of the rods 28 by pins 31, and the trolley sheave 32 runs on a pin 33 in the harp. The pin 33 is held parallel to the pivot pin 5 of the tilting bracket by the two parallel supporting rods 28.

The six helical springs combine to hold the trolley pole in an inclined position, as shown in Fig. 1, so that the trolley sheave runs in contact with the line wire 35. The trolley pole is reversed to enable the car to run in the other direction. In Fig. 2 the trolley is shown in an intermediate position so as to show all the spring connections clearly. The tension of the springs is adjusted from time to time by means of the tension rods, so as to hold the trolley sheave in working engagement with the line wire.

The friction of the pin connections and the weight of the inclined rods 28 are sufficient to hold the trolley sheave and harp in position laterally without the use of springs, and when the trolley sheave has been placed in engagement with the line wire, the line wire guides the trolley sheave and retains it in its working position.

What I claim is:

1. In a trolley, the combination, with a base provided with a pair of upwardly projecting bearings, of a bracket formed of a crosspiece having substantially triangular plates at its ends the middle parts of which are pivoted to the said bearings, the lower angle portions of the said plates forming arms upon opposite sides of the pivot, a plate secured to the middle part of the bracket and arranged radially of its pivot, two parallel rods pivoted to the said plate, a trolley harp pivoted to the said rods and provided with a trolley sheave which is movable laterally of the bracket and which is maintained constantly in parallel longitudinal and vertical planes, a frame secured to the base and projecting beyond the said arms, and tension springs arranged in pairs and secured between the ends of the arms and the corresponding ends of the frame, at each end of the frame, all the said springs being in tension simultaneously and operating to elevate the said rods whether arranged for normal forward travel or the reverse.

2. In a trolley, the combination, with a base provided with a pair of upwardly projecting bearings, of a bracket formed of a crosspiece having substantially triangular plates at its ends the middle parts of which are pivoted to the said bearings, the lower angle portions of the said plates forming arms upon opposite sides of the pivot, a plate secured to the middle part of the bracket and arranged radially of its pivot, two parallel rods pivoted to the said plate, a trolley harp pivoted to the said rods and provided with a trolley sheave which is movable laterally of the bracket and which is maintained constantly in parallel longitudinal and vertical planes, a frame secured to the base and projecting beyond the said arms, equalizing bars having their middle parts pivotally connected to the opposite ends of the frame, and tension springs arranged in pairs and secured between the ends of the arms and the corresponding ends of the equalizing bars at each end of the frame, all the said springs being in tension simultaneously and operating to elevate the said rods whether arranged for normal forward travel or the reverse.

3. In a trolley, the combination, with a stationary support adapted to be secured to a car, of a bracket pivoted to the said support and free to tilt longitudinally of the car, said bracket having arms at its ends which project longitudinally on each side of its pivot, a plate secured to the middle part of the bracket and arranged radially of its pivot, two parallel rods pivoted to the said plate, a trolley harp pivoted to the said rods and provided with a trolley sheave which is movable laterally of the bracket and which is maintained constantly in parallel longitudinal and vertical planes, and tension springs secured to the said arms and to each end portion of the support, all the said springs being in tension simultaneously and operating to elevate the said rods whether arranged for normal forward travel or the reverse.

In testimony whereof I have affixed my signature in the presence of two witnesses.

JOHN GAY.

Witnesses:
BENJ. H. JONES,
RAYMOND D. BELSHAW.

Copies of this patent may be obtained for five cents each, by addressing the "Commissioner of Patents, Washington, D. C."